United States Patent
Gautier et al.

(10) Patent No.: US 7,054,363 B2
(45) Date of Patent: May 30, 2006

(54) VARIABLE BIT RATE VIDEO ENCODING METHOD AND DEVICE

(75) Inventors: Pierre Gautier, Nogent-sur-Marne (FR); Thomas Ledru, Versailles (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 805 days.

(21) Appl. No.: 09/808,192

(22) Filed: Mar. 14, 2001

(65) Prior Publication Data

US 2001/0050954 A1    Dec. 13, 2001

(30) Foreign Application Priority Data

Mar. 21, 2000    (EP) ................... 00400780

(51) Int. Cl.
*H04N 7/12*    (2006.01)
(52) U.S. Cl. ............ 375/240.03; 375/240; 375/240.01; 375/240.02; 375/240.12
(58) Field of Classification Search ........... 375/240.03, 375/240, 240.12, 240.22, 240.24, 240.15, 375/240.04, 240.01, 240.02; 382/253; 348/415.1
See application file for complete search history.

(56) References Cited

U.S. PATENT DOCUMENTS 5,134,476 A * 7/1992 Aravind et al. .......... 348/415.1
5,317,397 A * 5/1994 Odaka et al. .......... 375/240.15
5,650,860 A * 7/1997 Uz ............................. 382/253
6,259,733 B1* 7/2001 Kaye et al. ................. 375/240

FOREIGN PATENT DOCUMENTS

EP    0434427 A2    12/1990
EP    IB9801031    7/1998

OTHER PUBLICATIONS

"MPEG Video Coding: A Basic Tutorial Introduction", by S.R. Ely, BBC Research and Development Report, BBC-RD-1996/3.
Yokoyama Y. et al, "A Scene-Adaptive One-Pass Variable Bit Rate Video Coding Method for Storage Media", vol. 3, Oct. 1999, pp. 827-831.

* cited by examiner

*Primary Examiner*—Allen Wong

(57) ABSTRACT

The DVD standard, with which a very good quality is required all along the recording step, allows for variable bit rate transmission of data, according to which more bits are spent when the pictures are more complex. As the encoded sequence must fit into a fixed bit budget, the invention relates to an encoding method in which, thanks a first analysis step, corrective modifications of the quantization step of the encoding process are carried out at regular intervals during a second control step. These changes are made regarding the state of a reserve of bits, periodically computed and updated, but preferably only when said reserve reaches critical values, and in order to maintain said reserve at a value as close to 0 as possible.

3 Claims, 1 Drawing Sheet

VARIABLE BIT RATE VIDEO ENCODING METHOD AND DEVICE

FIELD OF THE INVENTION

The present invention relates to a variable bitrate video encoding method comprising, for encoding a sequence of frames, at least a quantization step of an input bitstream, a coding step of said quantized bitstream, and a control step of the quantization step with respect to a buffer occupancy at the output of said coding step, and to a corresponding encoding device. This invention has mainly applications in MPEG-2 encoders.

BACKGROUND OF THE INVENTION

The MPEG-2 data compression standard, described for instance in "MPEG video coding: a basic tutorial introduction", by S. R. Ely, BBC Research and Development Report, BBC-RD-1996/3, is not only a standard for digital video broadcasting, but also for storage on digital video disc (DVD). With conventional compact discs (CD), the bit transmission is fixed, and pictures may be CBR (constant bit rate) encoded. Unfortunately, to be encoded at a given quality, two different groups of pictures do not require the same amount of bits. Therefore, when encoding a video sequence, complex pictures will be strongly distorted while simple pictures will have a good quality.

This problem of a varying quality over a same sequence must be avoided with DVD where the best quality is required all along the recording. As a consequence, DVD standard allows for VBR (variable bit rate) transmission of data, which adapts to the picture complexity: as more bits can be spent for complex pictures than for others, the bit rate is varying during a sequence but the quality remains constant.

However, considering the encoding of a video sequence, another difficulty is here added to the constraint of a constant quality: the encoded sequence must fit into a fixed bit budget. In order to respect this additional constraint, it has been proposed, for instance in the international patent application PCT/IB-98/01031 (PHF98560) filed by the applicant on Jul. 6, 1998, to define VBR encoders that perform, prior to the final coding, one or several pre-analysis passes during which a lot of information dealing with the complexity of the pictures is collected and then used in a final pass for an optimization of the bit budget allocation. This means that the video source (e.g. a movie) is fully encoded several times in order to optimize the final recording, which takes a lot of time (for each sequence: number-of-VBR-passes×sequence-duration).

SUMMARY OF THE INVENTION

It is therefore a first object of the invention to propose a real-time encoding method allowing for variable bit rate coding in a faster manner than in the case of the VBR encoders hereinabove mentioned.

To this end, the invention relates to a method such as described in the introductory paragraph of the description and which is moreover characterized in that it also comprises an analysis step, for defining on the basis of parameters related to said input bitstream a reserve of bits periodically updated at each frame, and an additional control step, for maintaining, increasing or decreasing the quantization step value according to the state of said reserve of bits.

The main advantage of this solution is that it allows to perform in real time the encoding of a known duration video sequence together with making this encoding fit into a predetermined capacity.

Another object of the invention is to propose an encoding device allowing to implement said encoding method.

BRIEF DESCRIPTION OF THE DRAWINGS

The present invention will now be described, by way of example, with reference to the accompanying drawing in which.

DETAILED DESCRIPTION OF THE INVENTION

Figure 1:
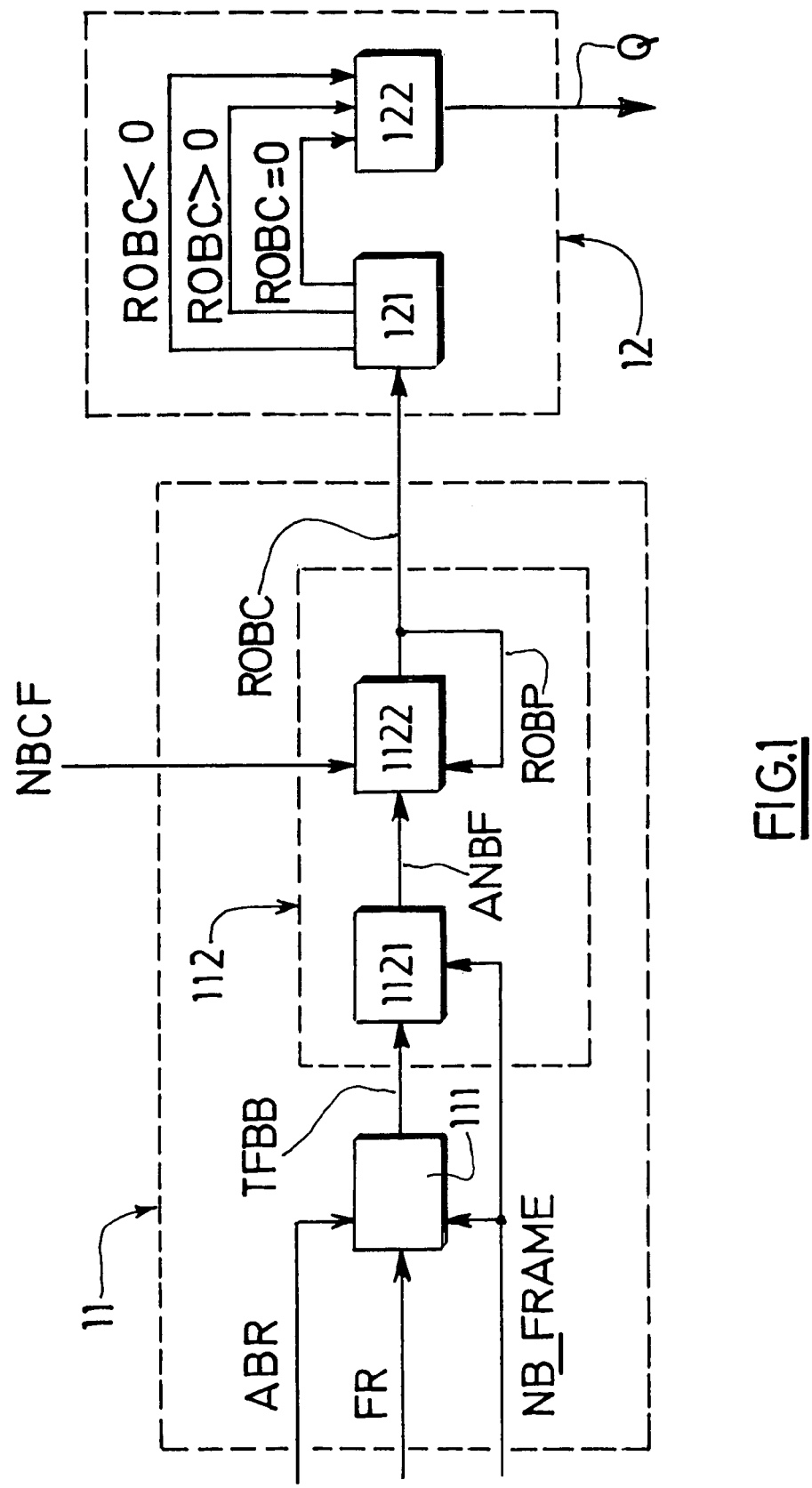
FIG. 1 illustrates the encoding method and device according to the invention.

As said above, one of the challenges of a real time VBR encoder is the fact that the encoded sequence (having a known duration) must fit into a limited bit budget. The invention now described, for which it is preferably assumed that, for a sequence long enough, there are hard and easy images to encode in rather equal proportion, is based on the fact that modifications of the quantizer step of the MPEG-2 encoding process are carried out at a regular rate.

The proposed encoding method and device, described with reference to FIG. 1, are based on the two following operations. A first step (analysis step) is provided for defining a reserve of bits, updated at each frame and which is intended to indicate if too many bits are spent or not. This reserve defining step 11 comprises the following sub-steps: a sub-step 111, allowing to compute on the basis of the average bit rate ABR (it may be considered, for instance, that the concerned video sequence should be encoded at the average bit rate of 5 Mb/s) a total fixed bit budget TFBB, and a sub-step 112, allowing to calculate said reserve of bits ROB (current). A second step (control step) is then provided for carrying out a test on the value of this reserve and modifying the quantizer step value accordingly. The total fixed bit budget TFBB is given by the relation (1):

$$TFBB = ABR \times FR \times NB\_FRAME \qquad (1)$$

with:
- FR=the frame rate;
- NB_FRAME=the total number of frames forming the sequence to be encoded (i.e. the sequence duration).

The reserve of bits, calculated (operation 1122) at the end of each encoding process of a frame, is given by the relation (2):

$$ROBC = ROBP + ANBF - NBCF \qquad (2)$$

with:
- ROBC=the new (or current) value of the reserve, associated to the current f frame which has just been encoded;
- ROBP=the value of the reserve associated to the previously encoded frame;
- ANBF=the average number of bits that should be used for each frame (obtained by means of the operation 1121 and equal to the total bit budget d divided by the number of frames: TFBB/NB_FRAME);
- NBCF=the number of bits used to encode the current frame (this information is received from the output of the encoder).

If said reserve is greater than 0, that means that until the current frame, the sequence has been encoded at an average bit rate lower than ABR (in the present case where the sequence should be encoded at the average bit rate ABR=5 Mb/s, it is then possible, the duration of the sequence being known, to deduce the total fixed bit budget that should be used to encode this whole sequence at said rate of 5 Mb/s). On the contrary, if said reserve is lower than 0, that means that too many bits have been spent and that there is a risk for the encoded sequence not to fit into the total fixed bit budget TFBB.

The defining step 11 is then followed by a control step 12, comprising a comparison sub-step 121 and a quantizer step value modification sub-step 122. It is known that the main way to regulate the number of bits spent to encode a frame is to modify the quantizer step value. According to the invention, it is proposed to dynamically change said value, called Q, regarding the state of the reserve so as to ensure that the encoding of the sequence fits into the bit budget. More precisely, the quantizer step is not modified for each frame (it would then lead to a kind of constant bit rate encoder), but only when the reserve reaches critical values. If Q_INIT is the initial given to the quantizer step, the evolution of the quantizer step Q is done in the present case in the following way (the thresholds here given can obviously be adjusted):

If (ROBC<0) and (0.07<−ROBC/TFBB<0.15)
then Q=Q_INIT+2
If (ROBC<0) and (0.15<−ROBC/TFBB<0.27)
then Q=Q_INIT+4
If (ROBC<0) and (0.27<−ROBC/TFBB<0.4)
then Q=Q_INIT+6
If (ROBC<0) and (0.4<−ROBC/TFBB<0.5)
then Q=Q_INIT+8
If (ROBC<0) and (0.5<−ROBC/TFBB<0.6)
then Q=Q_INIT+10
If (ROBC<0) and (0.6<−ROBC/TFBB<0.7)
then Q=Q_INIT+12
If (ROBC<0) and (0.7<−ROBC/TFBB)
then Q=Q_INIT+14
If (ROBC>0) and (0.1<ROBC/TFBB)
then Q=Q_INIT−1
Else ROBC=Q_INIT If the reserve ROBC is equal to 0, the value of Q is not modified. If the reserve is positive, Q may be reduced in order to spend more bits (the higher the positive value of the reserve, the higher the reduction). On the contrary, if the reserve is negative, the quantizer step is increased (Q_INIT+2, Q_INIT+4, . . . ), the increase of Q being in relation with the threshold x % to which the ratio ROBC/TFBB is compared. This situation means that the exceeding number of bits spent to encode all the previous frames is greater than x % of the total fixed bit budget TFBB (in the described example, it has been observed that the reserve is rarely greater than 27 to 30% of said bit budget).

All these rules define a global behaviour which is designed in order to have the reserve as close to 0 as possible at the end of the encoding process. This would then mean that the number of bits really spent is equal to TFBB. Even if this quantization step management does not guarantee an optimal quality of the sequence thus encoded, the performances of single pass encoders implemented on the basis of the present encoding method however appear to be close to those of known encoders in terms of subjective quality for the sequences that have been tested.

The invention claimed is:

1. An encoding method comprising, for encoding a sequence of frames, at least a quantization step of an input bitstream, a coding step of said quantized bitstream, and a control step of the quantization step with respect to a buffer occupancy at the output of said coding step, said method being characterized in that it also comprises an analysis step, for defining on the basis of parameters related to said input bitstream a reserve of bits (ROBC) periodically updated at each frame, and an additional control step, for maintaining, increasing or decreasing the quantization step value according to the state of said reserve of bits wherein evolution of an initial quantization step Q_INIT with respect to the state of the reserve (ROBC) is given by the following relations:
If (ROBC<0) and (S1<−ROBC/TFBB<S2)
then Q=Q_INIT+V1
If (ROBC<0) and (S2<−ROBC/TFBB<S3)
then Q=Q_INIT+V2
If (ROBC<0) and (S3<−ROBC/TFBB<S4)
then Q=Q_INIT+V3
If (ROBC<0) and (S4<−ROBC/TFBB<S5)
then Q=Q_INIT+V4
If (ROBC<0) and (S5<−ROBC/TFBB<S6)
then Q=Q_INIT +V5
If (ROBC<0) and (S6<−ROBC/TFBB<S7)
then Q=Q_INIT+V6
If (ROBC<0) and (S7<−ROBC/TFBB)
then Q=Q_INIT+V7
If (ROBC>0) and (T1<ROBC/TFBB)
then Q=Q_INIT−V8
Else ROBC=Q_INIT
where TFBB is total fixed bit budget, S1 to S7 are thresholds of increasing value, T1 is also a threshold, and V1 to V8 are the variations of said initial quantization step.

2. An encoding method according to claim 1, characterized in that said thresholds S1 to S7 are equal to (0,07; 0,15; 0,27; 0,4; 0,5; 0,6; 0,7) respectively, T1 is equal to (0,1) and said variations V1 to V8 are respectively equal to 2, 4, 6, 8, 10, 12, 14 and 1.

3. An encoding device allowing to implement an encoding method according to claim 1.

* * * * *